(12) United States Patent
Foti

(10) Patent No.: US 9,609,674 B2
(45) Date of Patent: Mar. 28, 2017

(54) MACHINE-TO-MACHINE DOMAIN PROXY

(71) Applicant: Telefonaktiebolaget L M Ericsson (Publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 14/231,310

(22) Filed: Mar. 31, 2014

(65) Prior Publication Data
US 2015/0282221 A1 Oct. 1, 2015

(51) Int. Cl.
H04L 29/08 (2006.01)
H04W 76/02 (2009.01)
H04W 4/00 (2009.01)
H04W 88/16 (2009.01)

(52) U.S. Cl.
CPC ........... H04W 76/021 (2013.01); H04L 67/28 (2013.01); H04W 4/005 (2013.01); H04W 88/16 (2013.01); H04W 76/023 (2013.01)

(58) Field of Classification Search
CPC . H04W 76/021; H04W 76/023; H04W 88/16; H04W 4/005; H04L 67/28
USPC ........................................................ 455/517
See application file for complete search history.

(56) References Cited

U.S. PATENT DOCUMENTS

2013/0188515 A1 7/2013 Pinheiro et al.
2015/0244776 A1* 8/2015 Pareglio ................ H04W 4/005
709/204

FOREIGN PATENT DOCUMENTS

WO 2013106188 A2 7/2013
WO 2013180357 A1 12/2013

OTHER PUBLICATIONS

International Search Report and Written Opinion dated Jul. 7, 2015 for International Application Serial No. PCT/IB2015/052252, International Filing Date—Mar. 26, 2015 consisting of 14-pages.
ETSI TS 102 690 v2.0.14 Machine-to-Macine Communications (M2M); Functional Architecture Jul. 5, 2013 consisting of 332 pages.

* cited by examiner

*Primary Examiner* — Raymond Dean
(74) *Attorney, Agent, or Firm* — Christopher & Weisberg, P.A.

(57) ABSTRACT

A node of a first machine-to-machine service provider, M2M SP, is provided. The node of the first M2M SP communicates with a gateway node and a node of a second M2M SP. At least one communication interface configured to receive, from the gateway node, a register message for registering a service capability layer, SCL, of the gateway node with the second NSCL. A processor configured to transmit the register message to the second NSCL and receive a response indicating whether the second NSCL registered the SCL. If the second NSCL registered the SCL, generating a resource instructing the node of the first M2M SP to proxy traffic of the SCL.

19 Claims, 10 Drawing Sheets

MACHINE-TO-MACHINE DOMAIN PROXY

TECHNICAL FIELD

The present invention relates to machine-to-machine (M2M) communications and in particular a method and node for proxying M2M communications between M2M service providers.

BACKGROUND

In the past several years, machine-to-machine (M2M) has spread into the mobile communications arena and M2M implementation continues to grow at a rapid pace. M2M generally refers to transferring information by using a communication network to exchange data from a machine to another machine that is implementing interconnection and internetworking between machines by using the communication network. The standards for M2M implementation are set forth in the European Telecommunications Standards Institute (ETSI) M2M standards. The ETSI M2M standards define concepts of a M2M network application (NA) and M2M device application (DA) that are M2M applications that run the service logic and use M2M service capabilities, network service capability layer (NSCL) that is the M2M service capabilities in the network domain, and service capability layer (SCL) as well as other concepts that are defined in the standard(s). In particular, the current ETSI M2M standards support NSCL to NSCL communication that is used for inter-operability between two M2M service providers.

However, the ETSI M2M standards make some implicit assumptions about inter-operability between two M2M Service Providers. For example, each M2M entity (hidden or visible) and a gateway (special type of visible entity) that is an M2M subscriber to a specific M2M service provider, may perform operations (read, subscribe, etc.) on other resources in another M2M domain if permitted to do so. Typically, being able to perform such operations requires business agreements and the operation is usually limited to reading resources and not more than that. While within the domain of the M2M SP for an M2M entity or device, the range of operations is much larger as the M2M device can create resources, write to resources, subscribe to resources, announce one resource to others, etc. but still subject to appropriate access controls.

Another implicit assumption is that each M2M entity/device (hidden or visible) and the gateway that is an M2M subscriber to an M2M service provider is required to first be authenticated with the M2M SP before the M2M subscriber can perform any operation. Another implicit assumption is that each operation going across multiple M2M SPs must go through the NSCL of each M2M SP in which the NSCL acts as a border between the two SPs across which all traffic between them has to transmit. More importantly is the assumption that a gateway can only be authenticated with the M2M SP that supplied the gateway. Therefore, an SCL instance belonging to a second M2M SP and that is resident and executes on a gateway supplied by the first M2M SP cannot perform any operation with the second M2M SP since the gateway can only be authenticated with the first M2M SP, as illustrated in FIG. 1.

Referring to FIG. 1, system 2 includes first SP gateway node 4 that is a special type of visible entity in the first M2M SP's domain. The first SP gateway 4 may only be authenticated by first M2M SP node 10a. First SP gateway node 4 may have subscriptions to the first M2M SP such that Gateway is associated with first SCL 6 of the first M2M SP. System 2 may include a first M2M SP node 10a with corresponding first NSCL 14, and second M2M SP node 10b with corresponding second NSCL 16. The first M2M SP is different from the second M2M SP. As illustrated in FIG. 1, first SP gateway node 4 is unable to communicate second SCL traffic with second M2M SP node 10b under ETSI M2M standards since first SP gateway node 4 cannot be authenticated by second M2M SP node 10b. Gateway node 4 is only able to be authenticated by first M2M SP node 10a to which gateway node 4 belongs. Therefore, first SP gateway node 4 having a subscription to a second SCL 8 belonging to second M2M SP node 10b would be useless as first SP gateway node 4 is unable to transit second SCL traffic to the second M2M SP node 10b.

SUMMARY

The present invention advantageously provides a method and node for proxying M2M communications between M2M service providers.

According to one embodiment of the invention, a node of a first machine-to-machine service provider, M2M SP, is provided. The node of the first M2M SP is configurable to communicate with a gateway node and a node of a second M2M SP. The first M2M SP is different from the second M2M SP. The gateway node is configurable to have a first subscription to the first M2M SP associated with a first network service capabilities layer, NSCL, and a second subscription to the second M2M SP associated with a second NSCL. The node of the first M2M SP includes at least one communication interface configured to receive, from the gateway node, a register message for registering a service capability layer, SCL, of the gateway node with the second NSCL. The node of the first M2M SP includes a processor configured to transmit the register message to the second NSCL and receive a response from the second NSCL, the response indicating whether the second NSCL registered the SCL of the gateway node. The processor is further configured to if the second NSCL registered the SCL of the gateway node, generate a resource, the generated resource instructing the node of the first M2M SP to proxy traffic of the SCL of the gateway node to the second NSCL.

According to one aspect of this embodiment, the generated resource indicates a target home NSCL to which traffic from the SCL of the gateway node is to be sent, the target home NSCL being the second NSCL. According to another aspect of this embodiment, the generating a resource includes adding at least one attribute to a resource structure tree of the node of the first M2M SP. The at least one attribute indicating the second NSCL is the NSCL home domain for the SCL. According to another aspect of this embodiment, the communication interface is further configured to receive an information request indicating the SCL of the gateway node is requesting information of the first NSCL. The processor is further configured to proxy the information request based at least in part on the generated resource by forwarding the information request to the second NSCL.

According to another aspect of this embodiment, the communication interface is further configured to receive the information request from the second NSCL. The processor is further configured to determine a host of the resource being requested and if the determined host of the resource being requested is the node of the first M2M SP, cause transmission of the requested resource to the second node of the second M2M SP for forwarding to the gateway node.

According to another aspect of this embodiment, if the determined host of the resource being requested is not the node of the first M2M SP, the communication interface is further configured to transmit the information request to the determined host. According to another aspect of this embodiment, the determined host of the resource being requested is the gateway node. According to another aspect of this embodiment, the register message indicates the first NSCL is to be the proxy for communications traffic of the SCL of the gateway node.

According to another embodiment of the invention, a method for a node of a first machine-to-machine service provider, M2M SP, is provided. The node of the first M2M SP is configurable to communicate with a gateway node and a node of a second M2M SP. The first M2M SP is different from the second M2M SP. The gateway node is configurable to have a first subscription to the first M2M SP associated with a first network service capabilities layer, NSCL, and a second subscription to the second M2M SP associated with a second NSCL. A register message for registering a service capability layer, SCL, of the gateway node with the second NSCL is received from the gateway node. The register message is transmitted to the second NSCL. A response from the second NSCL is received. The response indicates whether the second NSCL registered the SCL of the gateway. If the second NSCL registered the SCL of the gateway node, generating a resource, the generated resource instructs the node of the first M2M SP to proxy traffic of the SCL of the gateway node to the second NSCL.

According to one aspect of this embodiment, the generated resource indicates a target home NSCL to which traffic from the SCL of the gateway node is to be sent, the target home NSCL being the second NSCL. According to another aspect of this embodiment, generating a resource includes adding at least one attribute to a resource structure tree of the first M2M SP, the at least one attribute indicating the second NSCL as the NSCL home domain for the SCL.

According to another aspect of this embodiment, the information request is received from the second NSCL. A host of the information being requested is determined. If the determined host of the information being requested is the node of the first M2M SP, transmission of the requested information to the second node of the second M2M SP is caused for forwarding to the gateway node. According to another aspect of this embodiment, if the determined host of the information being requested is not the node of the first M2M SP, the information request is transmitted to the determined host. According to another aspect of this embodiment, the determined host of the information being requested is the gateway node. According to another aspect of this embodiment, the register message indicates the first NSCL is to be the proxy for communications traffic of the SCL of the gateway node.

According to another aspect of this invention, a node of a second machine-to-machine service provider, M2M SP, is provided. The node of the second M2M SP is configurable to communicate with a node of a first M2M SP and a gateway node. The first M2M SP is different from the second M2M SP. The gateway node is configurable to have a first subscription to the first M2M SP associated with a first network service capabilities layer, NSCL, and a second subscription to the second M2M SP associated with a second NSCL. The node of the second M2M SP includes at least one communication interface configured to receive, from the first NSCL, a register message for registering a service capability layer, SCL, of the gateway node with the second NSCL. The node of the second M2M SP includes a processor configured to generate at least one resource for the SCL of the gateway node. The at least one resource indicates communications to and from the SCL of the gateway node have to be proxied through the first NSCL. The at least one communication interface is configured to transmit a response to the first NSCL indicating the SCL of the gateway node is registered with the second NSCL.

According to one aspect of this embodiment, the at least one communication interface is configured to receive a proxied request, from the first NSCL, for information associated with the first SCL. The processor is further configured to determine the requested information is associated with the first NSCL and forward the request to the first NSCL. The communication interface is further configured to receive a response message from the first NSCL. The proxied response message includes the requested information. The communication interface is further configured to transmit the proxied response message to the first NSCL for forwarding to the SCL based at least in part on the generated at least one resource.

According to another aspect of the invention, a method for a node of a second machine-to-machine service provider, M2M SP, is provided. The node of the second M2M SP is configurable to communicate with a node of a first M2M SP and a gateway node. The first M2M SP is different from the second M2M SP. The gateway node is configurable to have a first subscription to the first M2M SP associated with a first network service capabilities layer, NSCL, and a second subscription to the second M2M SP associated with a second NSCL. A register message for registering a service capability layer, SCL, of the gateway node with the second NSCL is received from the first NSCL. At least one resource is generated for the SCL of the gateway node. The at least one resource indicates communications to and from the SCL of the gateway node have to be proxied through the first NSCL. A response is transmitted to the first NSCL indicating the SCL of the gateway node is registered with the second NSCL.

According to one aspect of this embodiment, a proxied request for information associated with the first SCL is received from the first NSCL. The requested information associated with the first NSCL is determined. The request is forwarded to the first NSCL. A response message is received from the first NSCL. The proxied response message includes the requested information. The proxied response message is transmitted to the first NSCL for forwarding to the gateway node based at least in part on the generated at least one resource.

According to another aspect of the invention, a node of a first machine-to-machine service provider, M2M SP, is provide. The node of the first M2M SP is configurable to communicate with a gateway node and a node of a second M2M SP. The first M2M SP is different from the second M2M SP. The gateway node is configurable to have a first subscription to the first M2M SP associated with a first network service capabilities layer, NSCL, and a second subscription to the second M2M SP associated with a second NSCL. The node of the first M2M SP includes at least one communication interface configured to receive, from the gateway node, a request message associated with the gateway node having a service capabilities layer, SCL, associated with the second M2M SP, for information associated with the first M2M SP. A processor configured to determine whether the first M2M SP has a business agreement with the second M2M SP. The business agreement allows the first NSCL to service the request and if the determination is made the first M2M SP has a business agreement with the second M2M SP, determining a host of the information being requested. If the determination is made the first M2M SP does not have a business agreement with the second M2M SP, the processor is further configured to cause proxying of the information request to the second NSCL for servicing of the request.

According to one aspect of this embodiment, if the information request is proxied to the second NSCL for servicing, the communication interface is further configured to receive the proxied information request from the second NSCL. The processor is further configured to determine a host of the information being requested and if the determined host of the information being requested is the node of the first M2M SP, cause transmission of the requested information to the second node of the second M2M SP for forwarding to the SCL. According to another aspect of this embodiment, if the determined host of the information being requested is not the node of the first M2M SP, the communication interface is further configured to transmit the information request to the determined host. According to another aspect of this embodiment, the communication interface is further configured to receive a response message from the determined host, the response message including the requested information and transmit the requested information to the second NSCL for forwarding to the gateway node.

According to another aspect of the invention, a method for a node of a first machine-to-machine service provider, M2M SP, is provided. The node of the first M2M SP is configurable to communicate with a gateway node and a node of a second M2M SP. The first M2M SP is different from the second M2M SP. The gateway node is configurable to have a first subscription to the first M2M SP associated with a first network service capabilities layer, NSCL, and a second subscription to the second M2M SP associated with a second NSCL. A request message associated with the gateway node having a service capabilities layer, SCL, associated with the second M2M SP, for information associated with the first M2M SP is received from the gateway node. A determination is made whether the first M2M SP has a business agreement with the second M2M SP. The business agreement allows the first NSCL to service the request. If the determination is made the first M2M SP has a business agreement with the second M2M SP, a host of the information being requested is determined. If the determination is made the first M2M SP does not have a business agreement with the second M2M SP, the information request is caused to be proxied to the second NSCL for servicing of the information.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
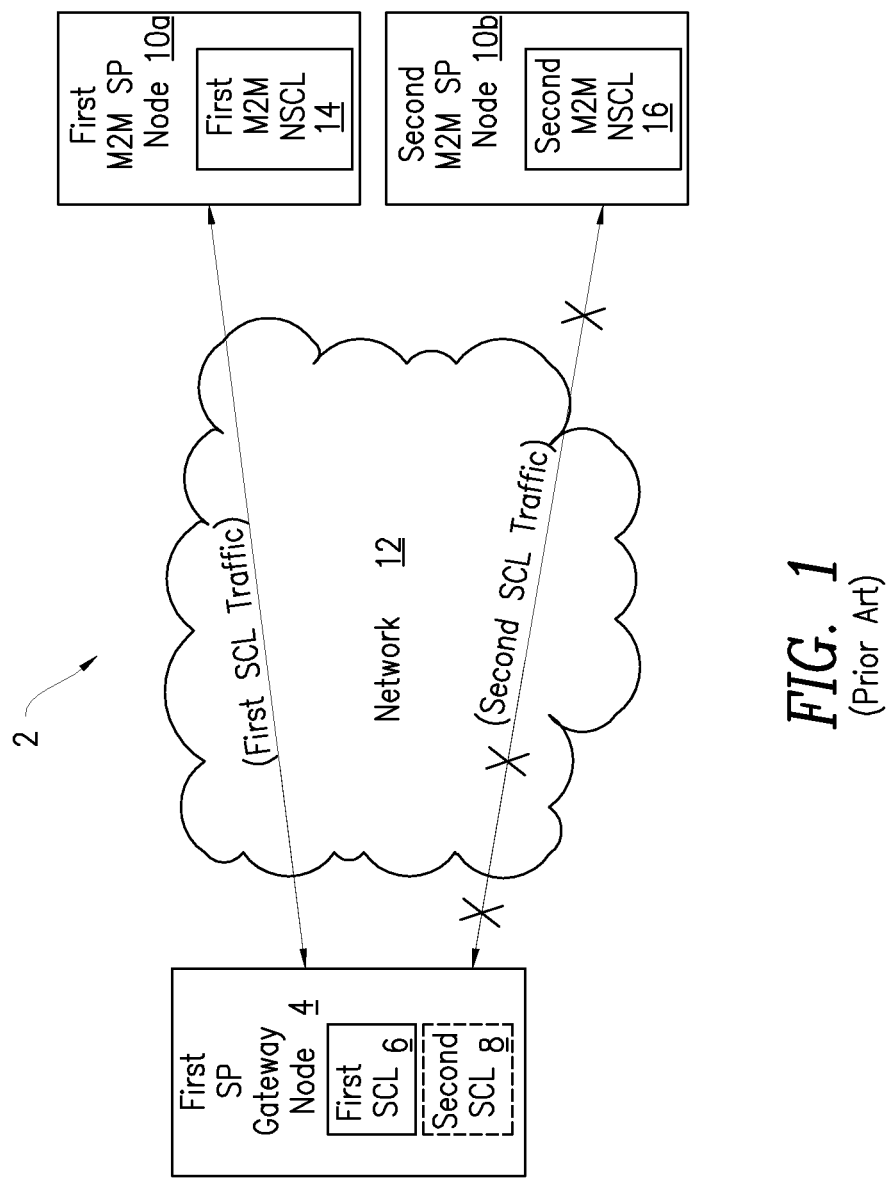
FIG. 1 illustrates an existing M2M communication system.

The present invention advantageously provides an apparatus, system and method for communicating M2M service capability layer traffic. Accordingly, the apparatus, system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 2:
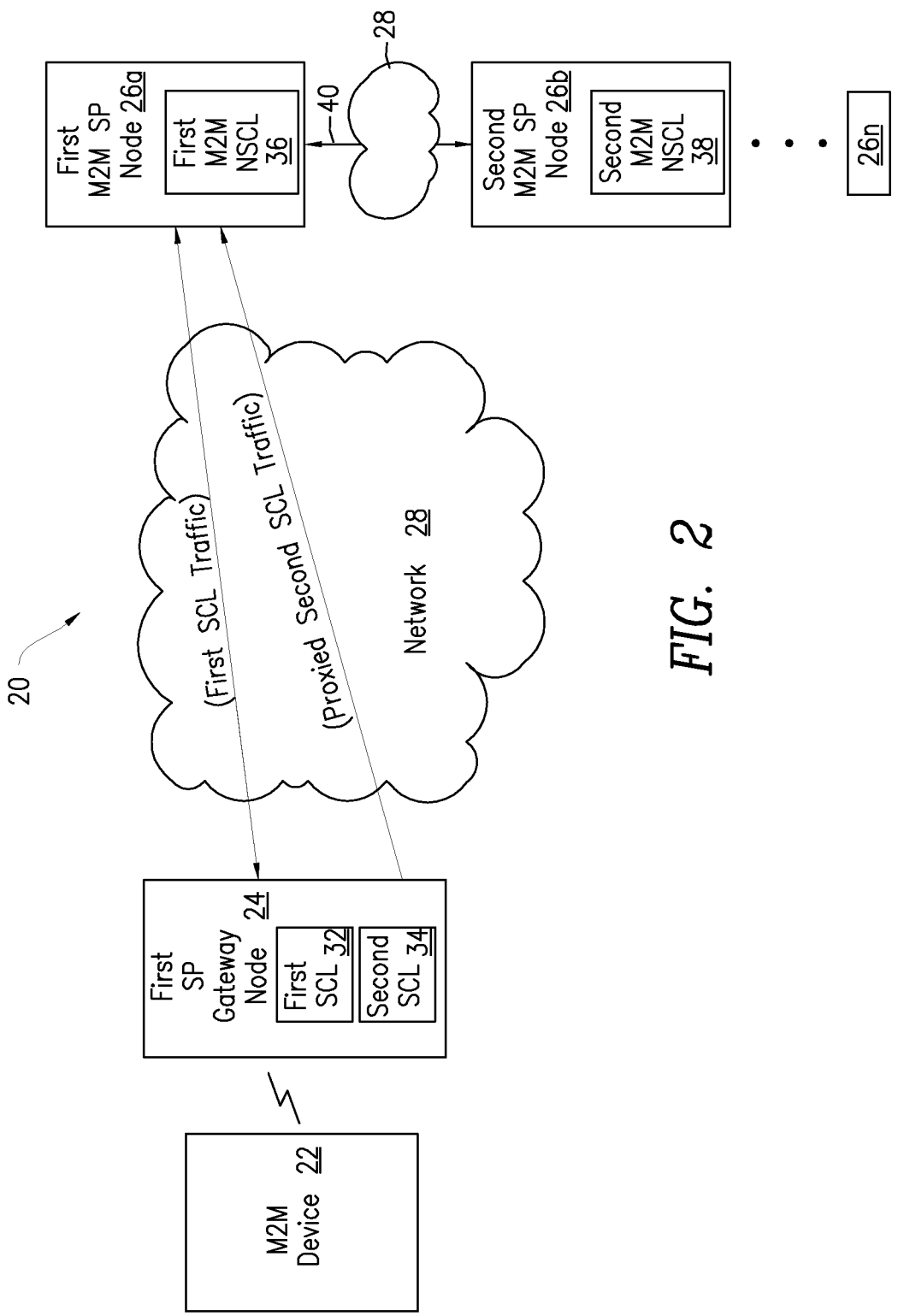
FIG. 2 is a block diagram of an exemplary communication system for communicating SCL traffic in accordance with the principles of the present invention.

Referring now to the drawing figures in which like reference designators refer to like elements there is shown in FIG. 2 an exemplary communication system for communicating SCL traffic constructed in accordance with the principles of the present invention and designated generally as "20." System 20 may include one or more M2M devices 22, one or more first SP gateway nodes 24 and multiple M2M SP nodes 26 in communication with each other via one or more networks 28. M2M device 22 runs at least one M2M application using M2M service capabilities (SCL). In one embodiment, M2M device 22 is associated with the second SCL of the second M2M SP. Examples of M2M device 22 may include sensors, networked e-reader, mobile devices and network appliances, among other devices that implement M2M functions.

In one embodiment, M2M device 22 connects to network 28 via first SP gateway node 24. First SP gateway node 24 is an M2M gateway that acts as a proxy for communications to/from M2M device 22. First SP gateway node 24 may perform one or more functions such as authentication, authorization, management and proxying, among other procedures as described herein. M2M device 22 is associated with the second M2M SP 26b and uses the second SCL 34 in gateway node 24 for that purpose. First gateway node 24 may include subscriptions to a service capabilities layer of the first M2M SP, i.e., first SCL 32, and a service capabilities layer of the second M2M SP, i.e., second SCL 34. First gateway node 24 may include subscriptions to other SCLs of other M2M SPs.

First M2M SP node 26a may include first M2M network service capabilities layer 36 that refers to the M2M services capabilities of the network domain of the first M2M SP. Second M2M SP node 26b may include second M2M network service capabilities layer 38 that refers to the M2M services capabilities of the network domain of the second M2M SP. The first M2M SP and second M2M SP may communicate with each other via network link 40 that may be part of network 28 or another network 28. The instant invention advantageously allows second SCL traffic to be proxied through first M2M NSCL such that gateway can support traffic associated with multiple M2M subscriptions for multiple M2M SPs using hardware from one M2M SP. First M2M SP node 26a, i.e., first M2M NSCL 36, acts as a proxy for access to second M2M SP node 26b, i.e., second M2M NSCL 38.

Figure 3:
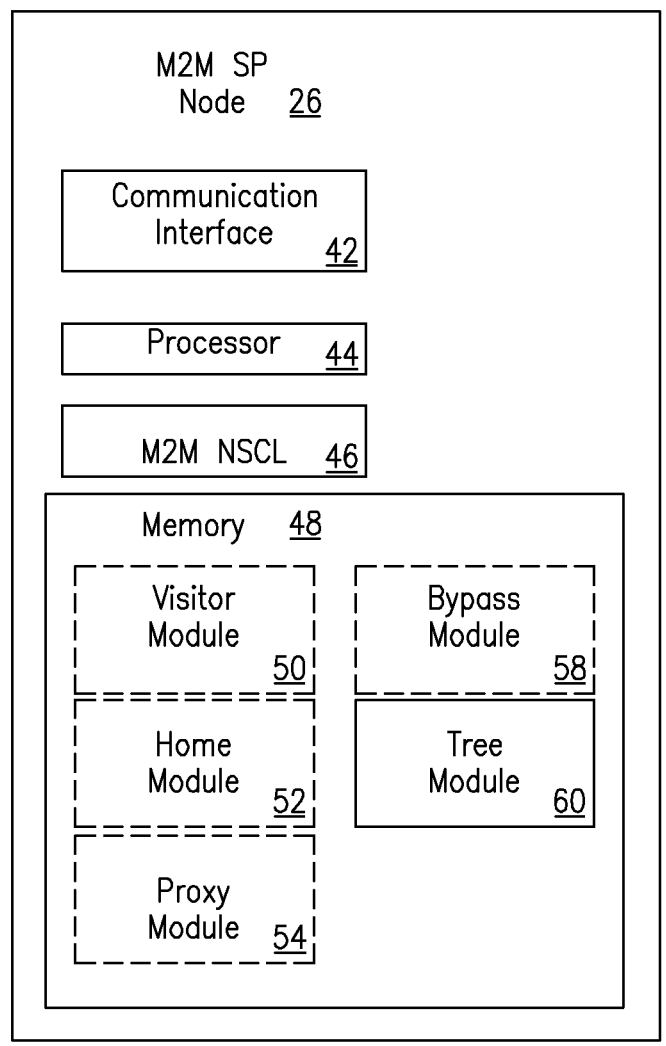
FIG. 3 is a block diagram of an exemplary M2M SP node having proxying functions in accordance with the principles of the present invention.

FIG. 3 is a block diagram of an M2M SP node 26 having proxying functionality. M2M SP node 26 includes communication interface 42 for communicating with at least one of another M2M SP node 26, network 28 and/or gateway node 24, among other networks, nodes, devise and entities. M2M SP node 26 includes one or more processors 44 for performing node functions described herein. M2M SP node 26 includes M2M NSCL 46 that is a logical representation of the M2M software serves M2M applications. M2M SP node 26 further includes memory 48. In particular, memory 48 may include non-volatile and volatile memory such as non-transitory computer readable medium that stores program instructions, which when executed by processor 44, cause processor 44 to perform the functions described herein. Non-volatile memory may include a hard drive, flash memory, memory stick and the like. Also, volatile memory may include random access memory and other memory known in the art.

Memory 48 may store at least one of visitor module 50, home module 52, proxy module 54, resource module 56, bypass module 58 and tree data 60, among other modules and/or data. Visitor module 50 configures M2M SP node 26 to proxy traffic associated with subscriptions that belong to another M2M SP. For example, visitor module 50 includes program instructions, which when executed by processor 44, cause processor 44 to perform the registering process, discussed in detail below with respect to FIG. 5. Home module 52 configures M2M SP node 26 to recognize traffic of at least one associated SCL that requires proxying. For example, home module 52 includes program instructions, which when executed by processor 44, cause processor 44 to perform the configuration process, discussed in detail below with respect to FIG. 6.

Proxy module 54 is configured to proxy SCL traffic for the M2M SP's own subscribers and that is destined to resources belonging to a different M2M SP. Proxy module 54 includes program instructions, which when executed by processor 44, cause processor 44 to perform the proxying process, discussed in detail below with respect to FIG. 8. Resource module 56 is configured to service a request from an SCL. Bypass module 58 configures M2M SP node 26 to service a request from another SCL of different M2M SP. Bypass module 58 includes program instructions, which when executed by processor 44, cause processor 44 to perform the bypass process, discussed in detail below with respect to FIG. 10.

Tree data 60 may include one or more resource structure trees that describe how different types of SCL resources relate to each other. ETSI Technical Specification (TS) 102 690 V2.1.1 defines several "branches" of the resource structure tree such as attribute, SCLS, applications, containers, groups, access rights, subscriptions and discovery branches. The instant invention advantageously adds a new "branch" to the resource structure tree for registering SCL that are not its own, i.e., belong to a different M2M SP. Alternatively and/or in addition to the new branch, the instant invention may advantageously add another new branch to the resource structure tree in order to allow the M2M NSCL to distinguish between SCLs that communicate directly with M2M NSCL and SCLs that communicate with M2M NSCL for proxying as described herein. Other tree data and other data may be stored in memory 48.

Figure 4:
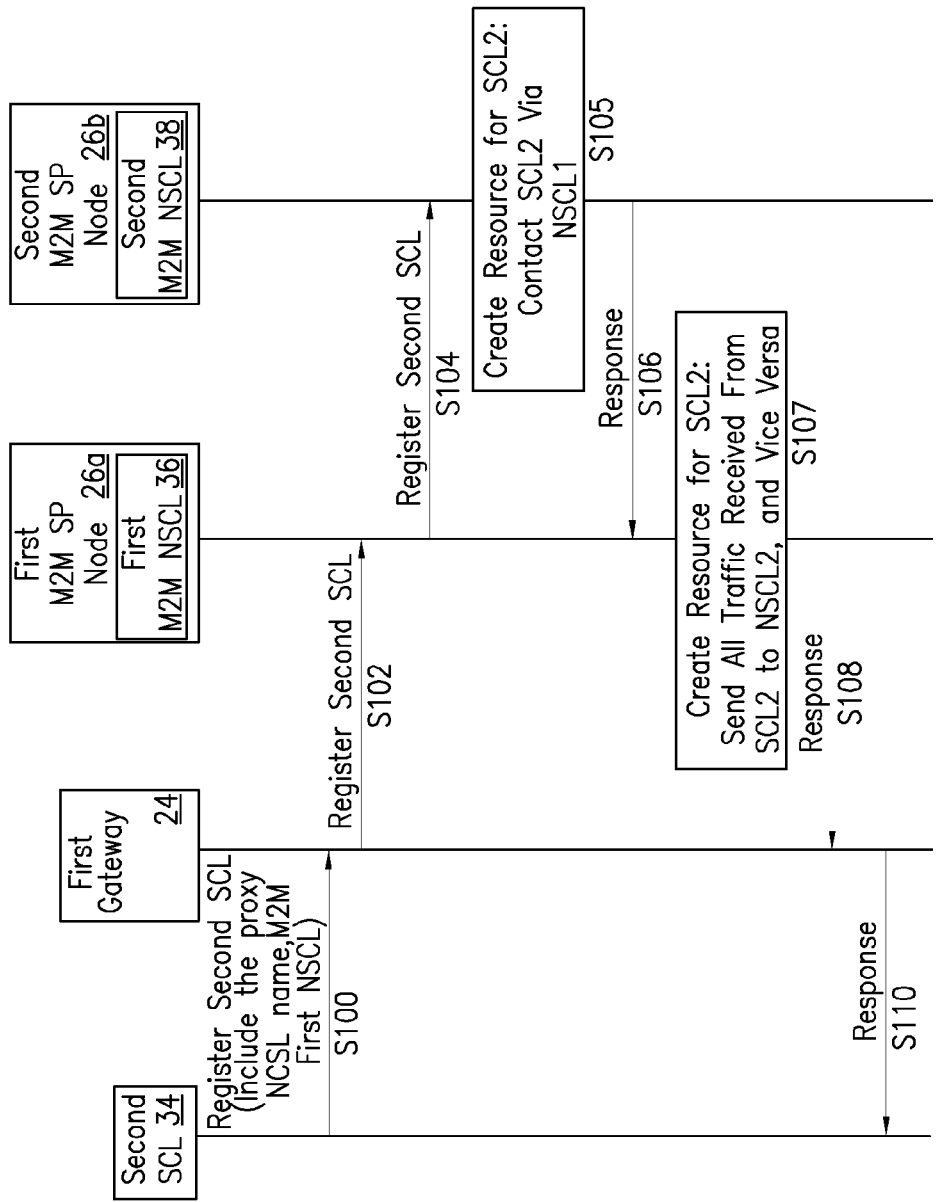
FIG. 4 illustrates a signaling diagram for registering an SCL with a corresponding M2M SP node in accordance with the principles of the present invention.

An exemplary signaling process for registering an SCL with a corresponding M2M SP node 26 is described with reference to FIG. 4. In the illustrated embodiment, second SCL 34 is associated with a second M2M SP. The second M2M SP is different from the first M2M SP. Second SCL 34 on gateway 24 transmits a register message to first gateway 24 to register second SCL 34 with a corresponding M2M SP, i.e., registering second SCL with second M2M SP (S100). The register message may include a domain name and/or proxy NSCL name, among other information. In the embodiment illustrated in FIG. 4, the domain name included in the register message corresponds to second M2M NSCL 38, and the proxy NSCL name corresponds to first M2M NSCL 36. The information included in the register message may indicate a different domain name and/or proxy NSCL name based at least in part on the SCL association of gateway 24 making the request.

First gateway 24 transmits the register message to first M2M SP node 26a (S102). In the embodiment illustrated in FIG. 4, first gateway 24 is provided by first M2M SP node 26a such that gateway 24 forwards SCL traffic associated with first M2M SP and second M2M SP to first M2M SP node 26a associated with first M2M SP that provided gateway 24. In another embodiment, gateway 24 may forward or transmit register message to a different M2M SP node depending on which M2M SP provided the gateway.

First M2M SP node 26a receives the register message from first gateway 24. First M2M SP node 26a determines that the register message is directed to another M2M based at least in part on the domain name and/or proxy NSCL name included in the register message. First M2M SP node 26a transmits the register message (S104). For example, the register message may be transmitted to the node corresponding to the domain name, i.e., second M2M SP node 26b. Second M2M SP node 26b receives the register message and authenticates SCL 34 of gateway node 24. Second M2M SP node 26b then authorizes and configures the resource structure tree, i.e., tree data 60, as described in detail with respect to FIG. 6 (S105). For example, second M2M SP node 26b creates resource(s) for second SCL 34 that indicates second M2M SP node 26b should contact second SCL 34 via first NSCL 36, i.e., contact SCL2 via NSCL1.

Second M2M SP node 26b transmits a response message indicating second M2M SP authenticated and registered SCL 340 of gateway 24 with second M2M SP node 26b (S106). In response to receiving the response message that indicates whether second SCL 340 of gateway 24 was registered, first M2M SP node 26a modifies tree data 60 to indicate traffic from registered second SCL 340 of gateway 24 is to be proxied, as discussed in detail with respect to FIG. 5 (S107). For example, first M2M SP node 26a creates resource(s) for second SCL 34 indicating for first M2M SP node 26a to send all traffic received from second SCL 34 to second NSCL 38, and vice versa. The first M2M SP node 26a transmits the response message to first gateway 24 (S108). First gateway 24 transmits the response message to second SCL 34 indicating whether second SCL 34 of gateway 24 was registered with second M2M SP node 26b (S110).

Figure 5:
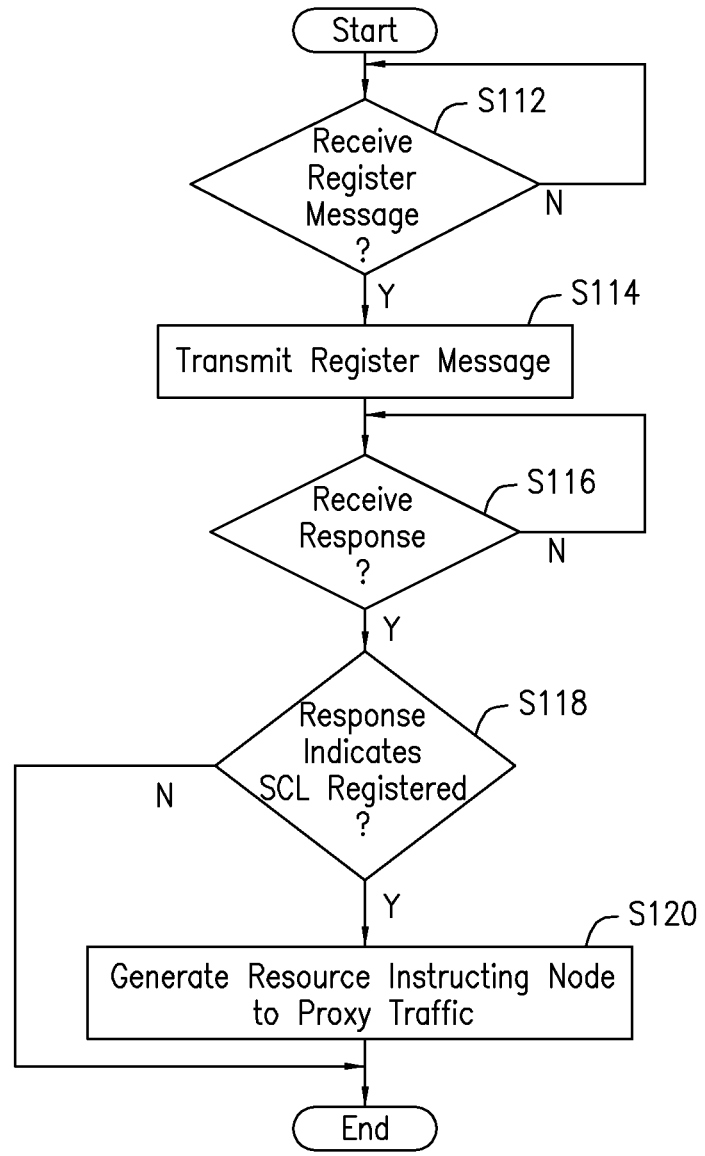
FIG. 5 is a flow chart of a node configuration process for configuring M2M SP node to proxy traffic of another M2M SP node in accordance with the principles of the present invention.

A node configuration process for configuring M2M SP node 26 to proxy traffic of another M2M SP is described with reference to FIG. 5. Processor 44 of first M2M SP node 26a determines whether a register message associated with second M2M SP has been received (Block S112). For example, a register message may be received via first gateway 24. If processor 44 determines a register message has not been received, processor 44 may continue to perform the determination of Block S112 until a register message is received. If processor 44 determines a register message associated with another M2M SP has been received, processor 44 causes transmission of the register message (Block S114). For example, processor 44 may cause transmission of the register message to the domain M2M SP included in the register message, i.e., second M2M SP node 26b.

Processor 44 determines whether a response message has been received (Block S116). The response message indicates whether second SCL 34, which generated the register message, was registered with a corresponding M2M SP, i.e., second M2M SP node 26b. If processor 44 determines no response message has been received, processor 44 may continue to perform the determination of Block S116 until a response message is received. For example, processor 44 may periodically repeat the determination of Block S116 and eventually time out if not received. If processor 44 determines a response message has been received, processor 44 determines whether the response message indicates that second SCL 34 of gateway 24 has been registered with second M2M SP 26b (Block S118). If processor 44 determines the register message indicates the second SCL 33 has been registered with second M2M SP node 26b, processor 44 generates resources for proxying traffic to/from second SCL 34 (Block S120). In particular, processor 44 may cause a new branch in a resource structure tree, i.e., tree data 60, to be added such that the new branch indicates second SCL 34 belongs to second NSCL 38, and for first M2M SP node 26a to send traffic from second SCL 34 transparently to second NSCL 38 since SCL 34 is not a subscriber of M2M SP1. First M2M SP 26a creates a new branch in the resource structure tree for registered SCLs that are not its own, i.e., second SCL 34 in which the new branch includes one or more attributes. The one or more attributes may include data specifying the second M2M SP node 26b as the home domain for the registered second SCL 34, in this embodiment. Second SCL 34 traffic may be labeled as proxied SCL traffic.

After determining resources, processor 44 may cause transmission of the response message toward second SCL 34 in gateway node 24. For example, processor 44 may cause communication interface 42 to forward the response message toward second SCL 34 of gateway node 24 that generated the registration message. Processor 44 may proxy second SCL 34 traffic to/from second M2M SP node 26b based at least in part on the determined resources, i.e., new branch in the resource structure tree. This allows first M2M SP node 26a to proxy traffic to/from first gateway 24 that is not its own, i.e., first gateway 24 belongs to first M2M SP that is different from second M2M SP. The configuration process of FIG. 5 is applicable to M2M SP nodes that are proxying traffic for other M2M SPs.

Figure 6:
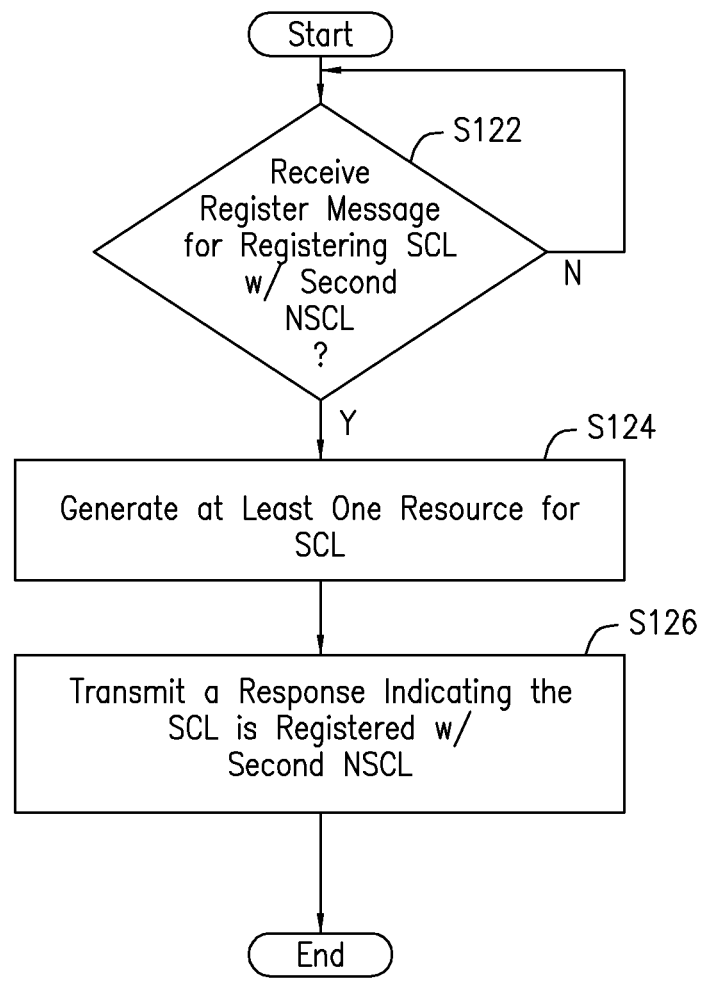
FIG. 6 is a flow chart of a node configuration process for configuring an M2M SP corresponding to the SCL of the gateway in accordance with the principles of the present invention.

A node configuration process for configuring tree data 60 of M2M SP node 26 that corresponds to the registering SLC 34 in gateway node 24 is described with reference to FIG. 6. Processor 44 of second M2M SP node 26b determines whether a register message for registering SCL 34 in gateway node 24 with second NSCL 38 has been received (Block S122). If processor 44 determines that the register message has not been received, processor 44 may perform the determination of Block S122 until a register message is received. If processor 44 determines a register message has been received, processor 44 generates at least one resource for second SCL 34 of gateway node 24 (Block S128). For example, processor 44 of second M2M SP node 26b may generate resources for communicating second SCL 34 traffic if second SCL 34 is authenticated by second M2M SP node 26b.

The generation of one or more resources may include adding and/or modify at least one branch of a resource structure tree, i.e., tree data 60, of second M2M SP node 26b such that second M2M SP node 26b contacts second SCL 34 via first M2M SP node 26a, i.e., via first M2M NSCL 36. After resource generation, processor 44 may cause a response message to be transmitted toward second SCL 34 in gateway node 24 via first M2M NSCL 36. The response message may indicate whether second SCL 34 of gateway node 24 was registered with second M2M SP node 26b. Alternatively, processor 44 may not generate resources for routing traffic from second SCL 34 such as if second M2M SP node 26b does not authenticate second SCL 34 of gateway node 24. If processor 44 does not generate resources, processor 44 may cause transmission of a response message toward second SCL 34 in which the response message indicates second SCL 34 was not registered with second M2M SP node 26b.

An exemplary signaling flow for requesting an SCL resource is described with reference to FIG. 7. Second SCL 34 transmits a request message (S128), which may be triggered by a hidden device such as device 22 logically located behind gateway 24. The request message may request one or more SCL resources/information. In the embodiment illustrated in FIG. 7, the request message is requesting one or more first SCL resources (information) associated with first M2M SP. This is considered to be an inter-M2M SP request because the requestor, SCL 34, is an M2M subscriber of M2M SP2 and is requesting a resource that belongs to M2M SP1. In the illustrated embodiment, SCL 34 transmits the request message to first gateway that is associated with first M2M SP node 26a. First gateway 24 transmits the request message of SCL 34 to first M2M SP node 26a (S130). First M2M SP node 26a proxies the request message to second M2M SP node 26b since the requested resource/information belongs to the second M2M SP. Second M2M SP node 26b services the request. In the illustrated embodiment, processor 44 of second M2M SP node 26b determines the requested resource/information does not belong to its domain.

Second M2M SP node 26b forwards the request to first M2M SP node 26a (S134). In this example, M2M SP 26a determines that the requested resource/information is located in the gateway node 24. Hence, M2M SP 26a forward the request to gateway node 24 (S136). First gateway 24 receives the request for first SCL resource/information and transmits a response message with the requested first SCL resources/information to second M2M SP node 26b via first M2M SP node 26a (S138 and S140). Second M2M SP node 26b forwards the response message with the requested first SCL resource(s)/information to second SCL 34 as requested (S142-S146). The signaling illustrated in FIG. 7 is based on first gateway 24 hosting the request first SCL resource/information such that the forwarding of the request message and/or response message may change if the requested SCL resource/information is located at or hosted by another entity; however, the signaling will still be based on at least in part on the determined and/or generated resources described in FIGS. 5 and 6. As discussed above, ETSI TS 102 690 V2.1.1 does not allow for first gateway node 24 associated via a subscription with first M2M SP to directly communicate with second M2M SP node 26b. New functionality to ETSI TS 102 690 V2.1.1 is provided herein by configuring M2M SP node 26a to proxy SCL traffic associated with another M2M SP node 26b transparently. The example, in FIG. 7 illustrates traffic belong to second SCL 34 associated with the second M2M SP domain 26b being proxied transparently from M2M SP1 to M2M SP2, but since the requested resources/information happens to be in M2M SP1, the request is sent back to M2M SP1 for subsequent processing in this example. If the requested resource/information was located in M2M SP 26b domain, then steps S134-S136, and S138-S140 would not be needed, then M2M SP node 26b would have forwarded the request to the hosting server within its domain. The response to any request follows the same path as the request.

A process performed by a node for proxying traffic of another M2M SP is described with reference to FIG. 8. Processor 44 of first M2M SP node 26a determines whether a request message associate with second SCL 34 has been received (Block S148). The request message may include the name of the proxy node such as first M2M SP node. If a request message associated with second SCL 34 of gateway 24 has not been received, processor 44 of first M2M SP node 26a may continue to perform the determination of Block S148 until a request message is received. If processor 44 determines that the request message has been received, processor 44 of first M2M SP node 26a causes the request to be proxied based at least in part on the generated resources described in detail with respect to Block S120 (Block S150). First M2M SP node 26a may perform additional signaling relating to communication of the request message (Block S152). In one embodiment, the additional signaling may include forwarding the request to another entity such as first gateway 24 as illustrated in FIG. 7, depending on the request. The additional signaling may vary based on the system 20 design. The signaling of S142-146 may differ from the signaling illustrated in FIG. 7 based at least in part on where the requested resource/information is located or hosted. For example, if the requested resource is located or hosted in a different entity, e.g., at second M2M SP node 26b, Blocks S136-S138 may be omitted.

Processor 44 of first M2M SP node 26a determines whether a response message has been received (Block S154). The response message may include the requested SCL resource/information. If processor 44 determines that a response message has not been received, processor 44 request the determination of Block S154 and may eventually time out if a response message is not received. If processor 44 determines the response message has been received, processor 44 forwards the response message towards second SCL that requested the resource/information (Block S156). In one embodiment, the forwarding may include transmitting the response message to first gateway 24 for subsequent transmission to second SCL 34.

Figure 9:
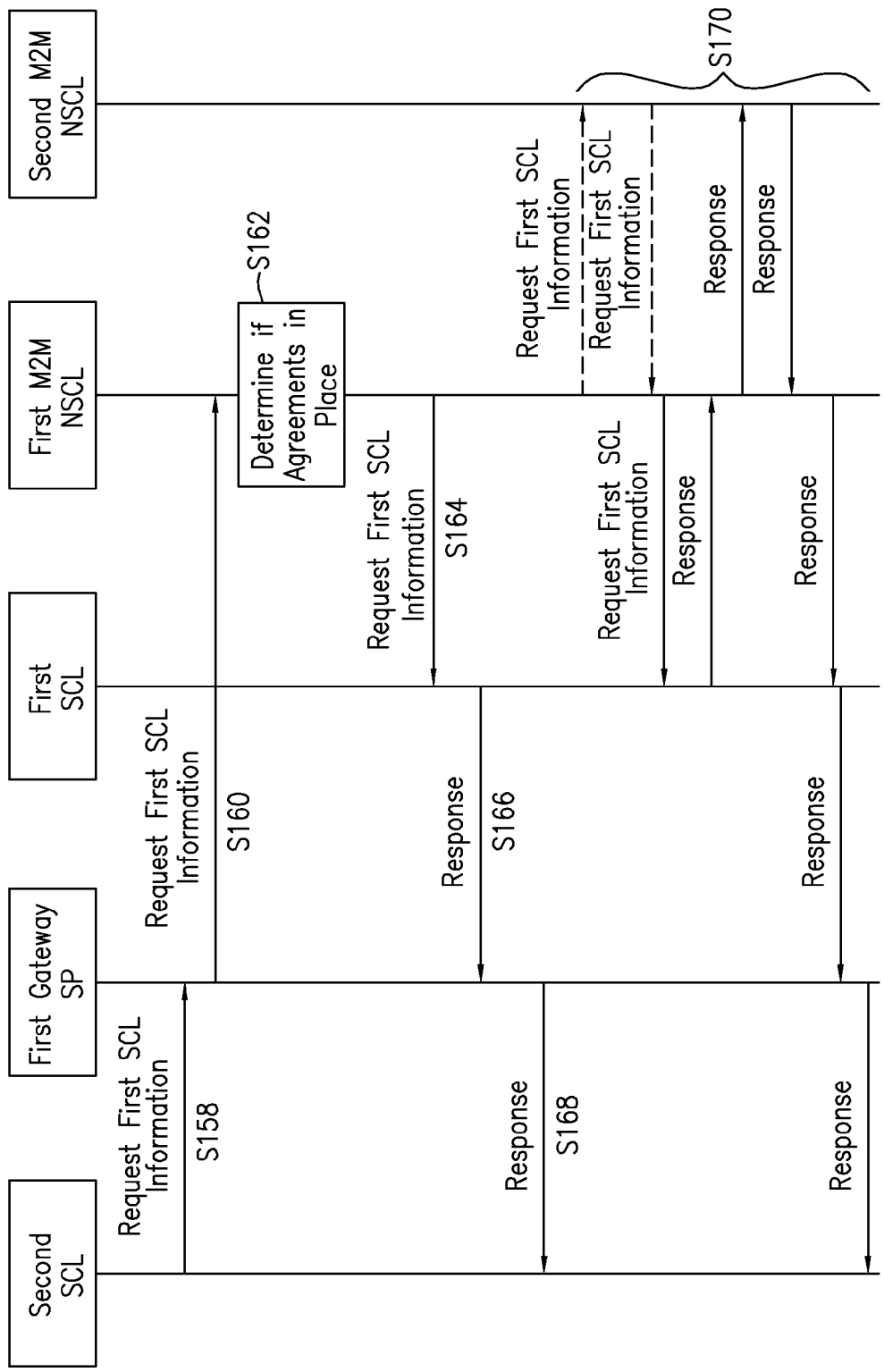
FIG. 9 is a signaling diagram of a bypass process in accordance with the principles of the present invention.

An exemplary bypass process is described with reference to FIG. 9. Similar to Blocks S128-130 of FIG. 7, device 22 through second SCL 34 and first gateway 24 transmits a request message that indicates second SLC 34 is requesting at least one resource, i.e., at least one first resource or information (S158-S160). First M2M SP node 26a determines whether a business agreement is in place with second M2M SP node 26b that allows first M2M SP node 26a to service the request (S162). If a business agreement is in place, first M2M SP node 26a services the request. First M2M SP node 26a determines the requested resource/information is located at and/or hosted by first SCL such that first M2M SP node 26a forwards the request to the first SCL (S164). First SCL receives the request message and transmits a response message toward first gateway 24 (S166-S168).

Figure 7:
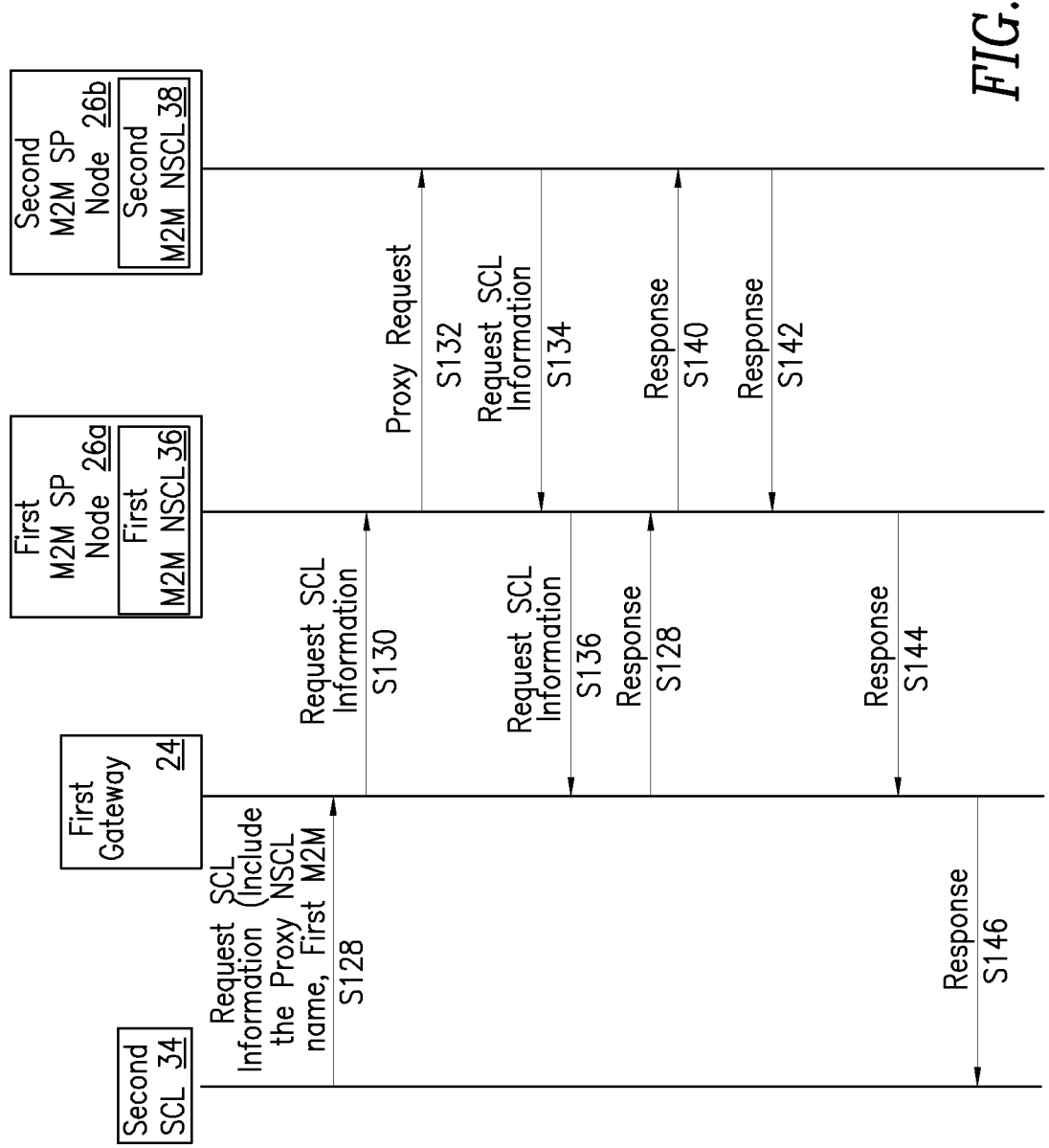
FIG. 7 is a signaling diagram for requesting an SCL resources in accordance with the principles of the present invention.
Figure 8:
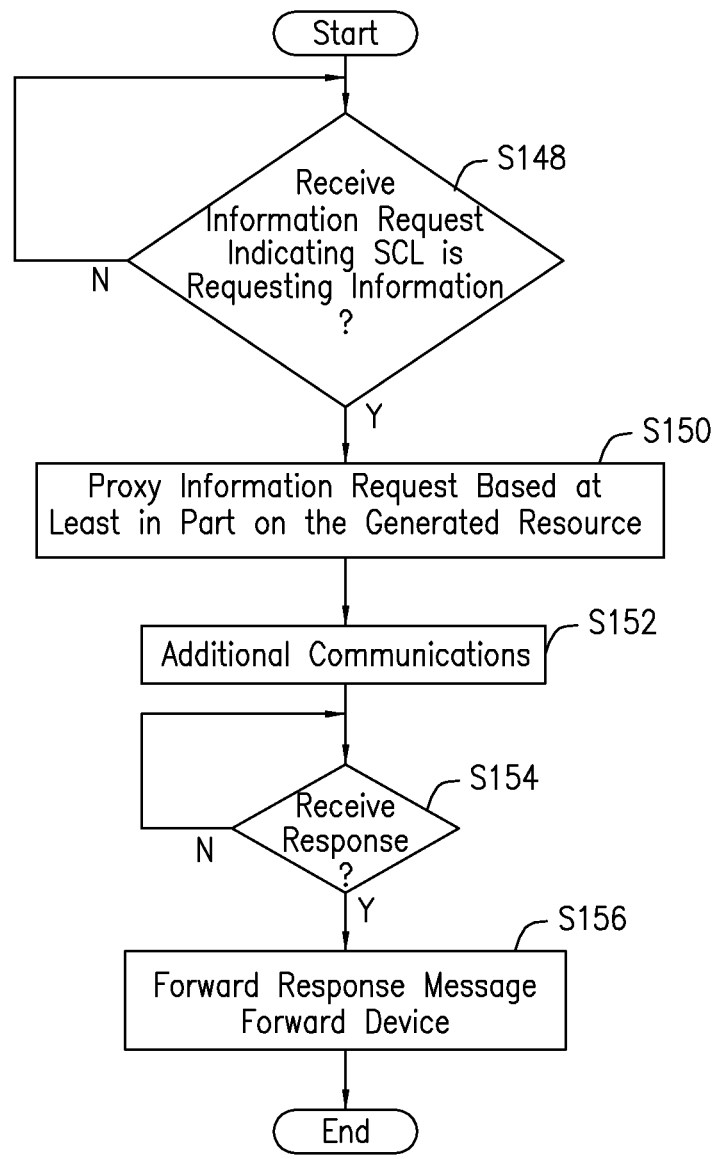
FIG. 8 is a flow chart of a node process for proxying traffic of another M2M SP node in accordance with the principles of the present invention

Alternatively, if no business agreement is in place with second M2M SP Node 26b that allows first M2M SP node 26a to service the request, first M2M SP node proxies the request to second M2M SP node 26b for forwarding to the entity hosting the requested SCL resource/information, and subsequent receipt of the response message at gateway 24 similar to FIG. 7 but with the requested resource/information located at and/or hosted by a different entity (S170).

Figure 10:
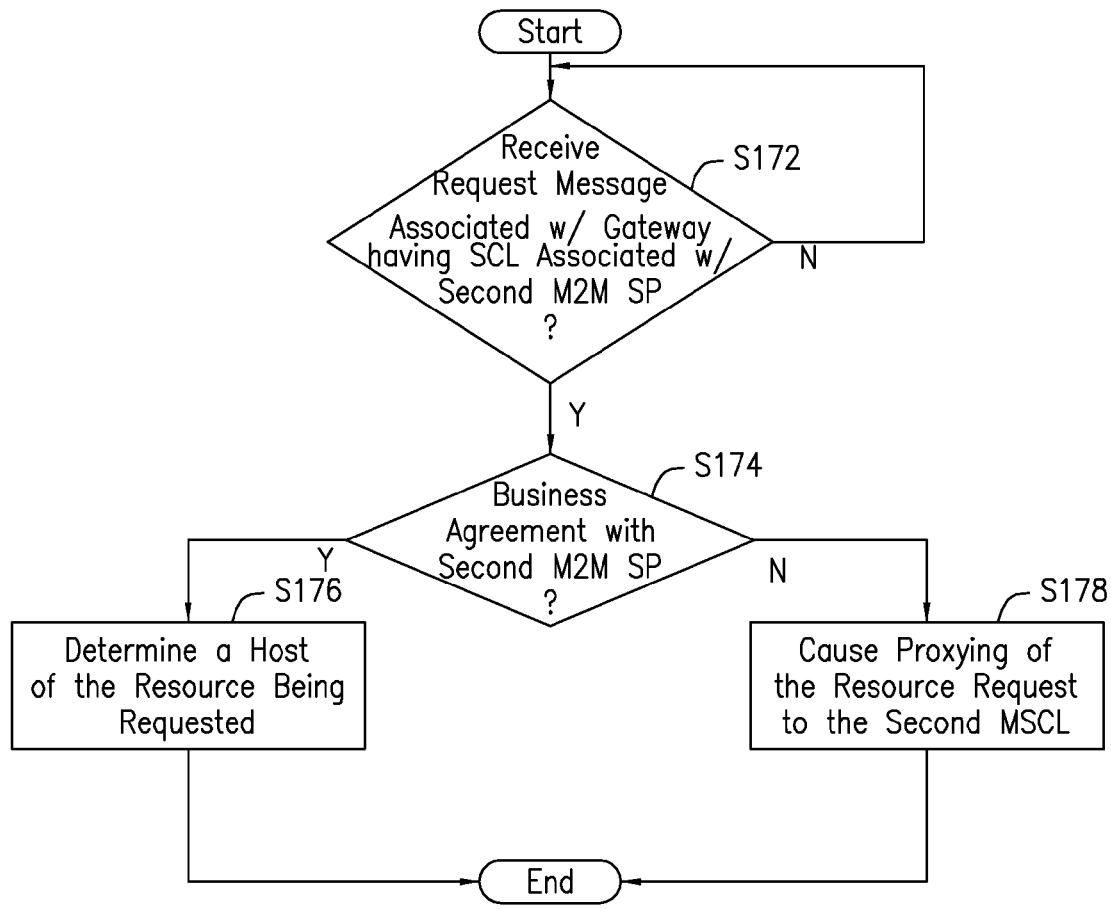
FIG. 10 is a flow chart of a process for performing bypass functions in accordance with the principles of the present invention.

A process performed by a node for performing the bypass process is described with respect to FIG. 10. Processor 44 of first M2M SP node 26a determines if a request message associated with second SCL 34 associated with the second M2M SP has been received (Block S172). The request message, i.e., information request message, may indicate second SCL 34 is requested at least one SCL resource/information. If processor 44 determines the request message has not been received, processor 44 may repeat the determination of Block S172 until a request message is received. If processor 44 determines the request message has been received, processor 44 determines whether there is a business agreement in place that allows first M2M SP node 26a to service the request (Block S174). If processor 44 determines that a business agreement is in place between first M2M SP node 26a and second M2M SP node 26b, processor 44 determines the location or host of the resource/information being requested (Block S176). Processor 44 causes the request message for at least one resource/information to be forwarded toward the entity where the requested SCL is located or hosted, e.g., first SCL in FIG. 10.

Referring back to Block S174, if processor 44 determines that a business agreement is not in place, processor 44 proxies the request message to second M2M SP node 26b based at least in part on tree data 60 as described above with respect to Block 150 (Block S178). Second M2M SP node 26b is then able to service the request. Additional signaling for proxying the request message and response message may occur as illustrated in FIG. 10. The additional signaling requested for proxying the request message and response message may vary based at least in part on which entity is hosting the requested resource/information. For example, if the requested resource is located at and/or hosted by first M2M SP node 26a, the forwarding of the request message to M2M SP 26b may be omitted.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope, which is limited only by the following claims.

What is claimed is:

1. A node of a first machine-to-machine service provider, M2M SP, the node of the first M2M SP being configurable to communicate with a gateway node and a node of a second M2M SP, the first M2M SP being different from the second M2M SP, the gateway node being configurable to have a first subscription to the first M2M SP associated with a first network service capabilities layer, NSCL, and a second subscription to the second M2M SP associated with a second NSCL, the node of the first M2M SP comprising:
at least one communication interface configured to
receive, from the gateway node, a register message for registering a service capability layer, SCL, of the
gateway node with the second NSCL; and
a processor configured to:
   transmit the register message to the second NSCL;
   receive a response from the second NSCL, the response
      indicating whether the second NSCL registered the
      SCL of the gateway node;
   if the second NSCL registered the SCL of the gateway
      node, generate a resource, the generated resource
      instructing the node of the first M2M SP to proxy
      traffic of the SCL of the gateway node to the second
      NSCL.

2. The node of claim 1, wherein the generated resource indicates a target home NSCL to which traffic from the SCL of the gateway node is to be sent, the target home NSCL being the second NSCL.

3. The node of claim 1, wherein generating a resource includes adding at least one attribute to a resource structure tree of the node of the first M2M SP, the at least one attribute indicating the second NSCL is the NSCL home domain for the SCL.

4. The node of claim 1, wherein the communication interface is further configured to receive an information request indicating the SCL of the gateway node is requesting information of the first NSCL; and
   the processor is further configured to proxy the information request based at least in part on the generated resource by forwarding the information request to the second NSCL.

5. The node of claim 4, wherein the communication interface is further configured to receive the information request from the second NSCL; and
   the processor is further configured to:
      determine a host of the resource being requested;
      if the determined host of the resource being requested is the node of the first M2M SP, cause transmission of the requested resource to the second node of the second M2M SP for forwarding to the gateway node.

6. The node of claim 5, wherein if the determined host of the resource being requested is not the node of the first M2M SP, the communication interface is further configured to transmit the information request to the determined host.

7. The node of claim 6, wherein the determined host of the resource being requested is the gateway node.

8. The node of claim 1, wherein the register message indicates the first NSCL is to be the proxy for communications traffic of the SCL of the gateway node.

9. A method for a node of a first machine-to-machine service provider, M2M SP, the node of the first M2M SP being configurable to communicate with a gateway node and a node of a second M2M SP, the first M2M SP being different from the second M2M SP, the gateway node being configurable to have a first subscription to the first M2M SP associated with a first network service capabilities layer, NSCL, and a second subscription to the second M2M SP associated with a second NSCL, the method comprising:
   receiving, from the gateway node, a register message for registering a service capability layer, SCL, of the gateway node with the second NSCL;
   transmitting the register message to the second NSCL;
   receiving a response from the second NSCL, the response indicating whether the second NSCL registered the SCL of the gateway node; and
   if the second NSCL registered the SCL of the gateway node, generating a resource, the generated resource instructing the node of the first M2M SP to proxy traffic of the SCL of the gateway node to the second NSCL.

10. The method of claim 9, wherein the generated resource indicates a target home NSCL to which traffic from the SCL of the gateway node is to be sent, the target home NSCL being the second NSCL.

11. The method of claim 9, wherein generating a resource includes adding at least one attribute to a resource structure tree of the first M2M SP, the at least one attribute indicating the second NSCL as the NSCL home domain for the SCL.

12. The method of claim 11, further comprising:
   receiving the information request from the second NSCL; and
   determining a host of the information being requested;
   if the determined host of the information being requested is the node of the first M2M SP, causing transmission of the requested information to the second node of the second M2M SP for forwarding to the gateway node.

13. The method of claim 12, wherein if the determined host of the information being requested is not the node of the first M2M SP, transmitting the information request to the determined host.

14. The method of claim 13, wherein the determined host of the information being requested is the gateway node.

15. The method of claim 9, wherein the register message indicates the first NSCL is to be the proxy for communications traffic of the SCL of the gateway node.

16. A node of a second machine-to-machine service provider, M2M SP, the node of the second M2M SP configurable to communicate with a node of a first M2M SP and a gateway node, the first M2M SP being different from the second M2M SP, the gateway node being configurable to have a first subscription to the first M2M SP associated with a first network service capabilities layer, NSCL, and a second subscription to the second M2M SP associated with a second NSCL, the node of the second M2M SP comprising:
   at least one communication interface configured to receive, from the first NSCL, a register message for registering a service capability layer, SCL, of the gateway node with the second NSCL;
   a processor configured to register the SCL of the gateway node by generating at least one resource for the SCL of the gateway node, the at least one resource indicating communications to and from the SCL of the gateway node have to be proxied through the first NSCL; and
   the at least one communication interface configured to transmit a response to the first NSCL indicating the SCL of the gateway node is registered with the second NSCL.

17. The node of claim 16, wherein the at least one communication interface is configured to receive a proxied request, from the first NSCL, for information associated with the first SCL; and
   the processor is further configured to:
      determine the requested information is associated with the first NSCL; and
      forward the request to the first NSCL;
   the communication interface is further configured to:
      receive a response message from the first NSCL, the proxied response message including the requested information; and
      transmit the proxied response message to the first NSCL for forwarding to the SCL based at least in part on the generated at least one resource.

18. A method for a node of a second machine-to-machine service provider, M2M SP, the node of the second M2M SP configurable to communicate with a node of a first M2M SP and a gateway node, the first M2M SP being different from the second M2M SP, the gateway node being configurable to have a first subscription to the first M2M SP associated with a first network service capabilities layer, NSCL, and a second subscription to the second M2M SP associated with a second NSCL, the method comprising:
- receiving, from the first NSCL, a register message for registering a service capability layer, SCL, of the gateway node with the second NSCL;
- registering the SCL of the gateway node by generating at least one resource for the SCL of the gateway node, the at least one resource indicating communications to and from the SCL of the gateway node have to be proxied through the first NSCL; and
- transmitting a response to the first NSCL indicating the SCL of the gateway node is registered with the second NSCL.

19. The method of claim 18, further comprising:
- receiving a proxied request, from the first NSCL, for information associated with the first SCL;
- determining the requested information is associated with the first NSCL; and
- forwarding the request to the first NSCL;
- receiving a response message from the first NSCL, the proxied response message including the requested information; and
- transmitting the proxied response message to the first NSCL for forwarding to the gateway node based at least in part on the generated at least one resource.

* * * * *